United States Patent
Palazzotto et al.

[11] Patent Number: 5,822,120
[45] Date of Patent: Oct. 13, 1998

[54] LAYERED RETROREFLECTIVE ELEMENTS

[76] Inventors: Michael C. Palazzotto; Wayne S. Mahoney, both of P.O. Box 33427, St. Paul, Minn. 55133-3427

[21] Appl. No.: 591,569
[22] PCT Filed: Feb. 5, 1996
[86] PCT No.: PCT/US96/01583
   § 371 Date: Feb. 5, 1996
   § 102(e) Date: Feb. 5, 1996
[87] PCT Pub. No.: WO97/28470
   PCT Pub. Date: Aug. 7, 1997
[51] Int. Cl.⁶ .................................................. G02B 5/126
[52] U.S. Cl. .................. 359/515; 359/534; 359/536; 359/541; 359/542; 359/900; 264/1.9; 404/12; 404/16
[58] Field of Search ..................... 359/515–529, 359/532, 534, 542, 546, 547, 551, 552, 900; 428/325, 402, 406; 404/9, 12, 16; 116/63 R; 264/1.1, 1.9

[56] References Cited

U.S. PATENT DOCUMENTS

| | | |
|---|---|---|
| 2,043,414 | 6/1936 | Korff . |
| 2,440,584 | 4/1948 | Heltzer et al. . |
| 3,043,196 | 7/1962 | Palmquist et al. . |
| 3,171,827 | 3/1965 | DeVries et al. ............................ 260/40 |
| 3,175,935 | 3/1965 | Vanstrum .................................. 156/3 |
| 3,252,376 | 5/1966 | DeVries . |
| 3,254,563 | 6/1966 | DeVries et al. . |
| 3,274,888 | 9/1966 | Vanstrum et al. . |
| 3,292,507 | 12/1966 | Vanstrum ................................ 94/1.5 |
| 3,418,896 | 12/1968 | Rideout ................................... 94/1.5 |
| 3,486,952 | 12/1969 | Vanstrum et al. ........................ 156/3 |
| 3,556,637 | 1/1971 | Palmquist . |
| 3,709,706 | 1/1973 | Sowman .................................. 106/57 |
| 3,849,351 | 11/1974 | Jorgensen ............................. 260/18 N |
| 3,891,451 | 6/1975 | Okazaki et al. ......................... 106/30 |
| 3,935,158 | 1/1976 | Watanabe ............................. 260/42.21 |
| 3,958,891 | 5/1976 | Eigenmann ............................. 404/16 |
| 4,035,059 | 7/1977 | DeMaster . |
| 4,069,281 | 1/1978 | Eigenmann ................................ 264/1 |
| 4,072,403 | 2/1978 | Eigenmann . |
| 4,166,147 | 8/1979 | Lange et al. ............................ 428/328 |
| 4,203,878 | 5/1980 | Bauer .................................. 260/18 EP |
| 4,367,919 | 1/1983 | Tung et al. . |
| 4,388,359 | 6/1983 | Ethen et al. ............................ 428/143 |
| 4,564,556 | 1/1986 | Lange ..................................... 428/325 |
| 4,652,172 | 3/1987 | Eigenmann ............................... 404/73 |
| 4,758,469 | 7/1988 | Lange ..................................... 428/325 |
| 4,772,511 | 9/1988 | Wood et al. ............................. 428/325 |
| 4,875,798 | 10/1989 | May ....................................... 404/12 |
| 4,937,127 | 6/1990 | Haenggi et al. ......................... 428/148 |
| 4,969,713 | 11/1990 | Wyckoff . |
| 4,983,458 | 1/1991 | Dejaiffe ................................. 428/402 |
| 4,988,541 | 1/1991 | Hedblom ................................. 427/163 |
| 4,988,555 | 1/1991 | Hedblom ................................. 428/172 |
| 5,053,253 | 10/1991 | Haenggi et al. ......................... 427/204 |
| 5,094,902 | 3/1992 | Haenggi et al. ......................... 428/150 |
| 5,124,178 | 6/1992 | Haenggi et al. ......................... 427/204 |
| 5,227,221 | 7/1993 | Hedblom ................................. 428/172 |
| 5,268,789 | 12/1993 | Bradshaw ................................ 359/534 |
| 5,286,682 | 2/1994 | Jacobs et al. ........................... 501/34 |
| 5,417,515 | 5/1995 | Hachey et al. .......................... 404/15 |
| 5,502,593 | 3/1996 | Hedgewick .............................. 359/536 |

FOREIGN PATENT DOCUMENTS 0322671 12/1988 European Pat. Off. .
A 17 84 654 9/1971 Germany .

OTHER PUBLICATIONS

ASTM test method E 1710—95, "Standard Test Method for Measurement of Retroreflective Pavement Marking Materials with CEN–Prescribed Geometry Using a Portable Retroreflectometer", Jul. 1995, pp. 1–4.

ASTM test method D 4061—81, "Standard Test Method for Retroreflectance of Horizontal Coatings", Dec. 1981, pp. 877–884.

*Primary Examiner*—James Phan
*Attorney, Agent, or Firm*—Lisa M. Fagan; Robert H. Jordan

[57] ABSTRACT

A retroreflective element which may be used in pavement markings comprising a core having (a) a central layer having first and second major surfaces and at least one vertical surface, (b) a barrier layer applied to the first major surface, and (c) a barrier layer applied to the second major surface; and a plurality of optical elements embedded in the vertical surface(s) of the central layer.

25 Claims, 1 Drawing Sheet

LAYERED RETROREFLECTIVE ELEMENTS

FIELD OF THE INVENTION

The present invention relates to retroreflective elements which may be placed in pavement markings to guide and direct motorists traveling on a roadway.

BACKGROUND OF THE INVENTION

The use of pavement markings (e.g., paints, tapes, and individually mounted articles) to guide and direct motorists traveling along a roadway is well known. During the daytime the markings may be sufficiently visible under ambient light to effectively signal and guide a motorist. At night, however, especially when the primary source of illumination is the motorist's vehicle headlights, the markings are generally insufficient to adequately guide a motorist because the light from the headlight hits the pavement and marking at a very low angle of incidence and is largely reflected away from the motorist. For this reason, improved pavement markings with retroreflective properties have been employed.

Retroreflection describes the mechanism where light incident on a surface is reflected so that much of the incident beam is directed back towards its source. The most common retroreflective pavement markings, such as lane lines on roadways, are made by dropping transparent glass or ceramic optical elements onto a freshly painted line such that the optical elements become partially embedded therein. The transparent optical elements each act as a spherical lens and thus, the incident light passes through the optical elements to the base paint or sheet striking pigment particles therein. The pigment particles scatter the light redirecting a portion of the light back into the optical element such that a portion is then redirected back towards the light source.

In addition to providing the desired optical effects, pavement markings must withstand road traffic and weathering, adverse weather conditions, and cost constraints.

Vertical surfaces provide better orientation for retroreflection; therefore, numerous attempts have been made to incorporate vertical surfaces in pavement markings, typically by providing protrusions in the marking surface. In addition, vertical surfaces may prevent the build-up of a layer of water over the retroreflective surface during rainy weather which otherwise interferes with the retroreflection mechanism.

One means of providing vertical surfaces is to place raised pavement markers at intervals along a pavement marking line (e.g., U.S. Pat. Nos. 3,292,507, 4,875,798). These markers are relatively large, generally several centimeters in width and 5 to 20 millimeters in height. Typically, the markers require assembling together different components, some of which were previously individually molded or casted. Therefore, the markers are relatively expensive to manufacture. The size of the markers subjects them to substantial impact forces from passing vehicles. As a result, the markers must be substantially secured to the pavement, increasing the installation costs and removal costs when they wear out. Moreover, because the markers are applied at intervals, the bright spots of light are discontinuous, rather than the desired continuous bright line.

Embossed pavement marking tapes are a second means of providing vertical surfaces (e.g., U.S. Pat. Nos. 4,388,359, 4,069,281, and 5,417,515). Although pavement marking tapes effectively retroreflect light, they are relatively expensive compared to conventional painted markings, and thus their use is often limited to critical areas such as unlighted intersections and railway crossings.

A third means of providing vertical surfaces for retroreflection is a composite retroreflective element or aggregate (e.g., U.S. Pat. Nos. 3,252,376, 3,254,563, 4,983,458, 4,072,403; 4,652,172; 5,268,789). Many variations are known, but the retroreflective elements essentially have a core with optical elements embedded in the core surface. Some known embodiments also contain optical elements dispersed throughout the core. The core may be irregular in shape or may be regularly shaped e.g., spheres, tetrahedrons, discs, square tiles, etc. Retroreflective elements are advantageous because they can be embedded into inexpensive painted markings.

Retroreflective elements are largely comprised of polymeric cores or binders. A pigmented core or binder often serves as a diffuse reflector. This arrangement allows spherical optical elements to be used on either horizontal or vertical surfaces. Other constructions have transparent optical elements comprising a specular reflector such as metallic silver. The metallic surface directs light back towards the source and a pigmented core is not necessary. Because of the geometry of the optics, a specular coated optical element would not be as effective if embedded in a pavement marking paint (a horizontal surface), and would be more highly effective if embedded in the vertical edges of a retroreflective element.

Retroreflective elements can also be constructed having a ceramic core and glass optical elements with a metallic specular coating, (e.g., U.S. Pat. Nos. 3,043,196, 3,175,935, 3,556,637, 3,274,888, 3,486,952, EP 0,322,671). Ceramic retroreflective elements typically exhibit greater resistance to weathering and to wear, but often require substantially higher processing temperatures which increases cost.

Retroreflective elements can be formed by various methods. For example, drops of liquid resin can dropped into a bed of glass optical elements. The optical elements embed into the resin and then the resin hardens. (U.S. Pat. No. 3,254,563).

Another formation method is casting liquid resin mixed with glass optical elements into a desired shape and spraying the exposed surfaces with additional glass optical elements. The resin is then hardened. (U.S. Pat. No. 4,983,458).

Another method is calendering polymeric material through a set of rollers containing die-forming recesses. The optical elements are then attached to the bottom of the core with a transparent polymer binder. Specular film is applied by vacuum metallization. (U.S. Pat. Nos. 4,072,403, 4,652,172, 5,268,789).

U.S. Pat. No. 3,958,891 discloses skid-resistant or retroreflective elements manufactured by cutting or punching small disks from calendered tape (such as epoxy or polyurethane resin). The disks are then coated with a layer of resinous binder and a monolayer of optical elements. After the binder substantially sets, a further layer of binder and a monolayer of optical elements are applied. These steps are repeated until the desired coating of optical elements is obtained.

Another method of forming retroreflective elements is to extrude and pelletize cores and then place the cores in a bed of pre-heated optical elements, where the optical elements embed into the core (U.S. Ser. No. 08/503,432, Hachey et al.).

Each of these methods forms a retroreflective element having optical elements covering substantially all of the core surface area.

One means of reducing the cost of retroreflective elements without substantially affecting retroreflective performance, is to selectively place optical elements on vertical surfaces. The optical elements are relatively expensive, particularly the ceramic optical elements, thus limiting their placement to vertical surfaces where light is optimally retroreflected and foregoing placement on horizontal surfaces, is often desirable.

In the embossed pavement marking tape area, U.S. Pat. Nos. 5,227,221, 4,988,555, and 4,988,541 disclose pavement marking tapes having a patterned base sheet and selectively applying a bonding material to the protuberances so that the optical elements and/or skid-resistant particles are secured exclusively to the protuberances having bonding material where they are most effective. The optical elements and/or skid-resistant particles are substantially absent from the valleys where they make little contribution to the retroreflective performance or the skid resistance of the pavement marking. By selectively securing the optical elements and skid-resistant particles to the protuberances, fewer optical elements and fewer skid-resistant particles can be employed without sacrificing retroreflective performance and skid-resistance.

In the retroreflective element area, U.S. Pat. No. 3,418,896 discloses shaped polymeric retroreflective elements having a pigmented core and glass optical elements embedded in the vertical edges. These retroreflective elements are formed by extruding or otherwise molding the pigmented polymer into rods of different cross-sectional shape. Glass optical elements are embedded into the surface of the polymer before it hardens, then the rods are sliced to form the desired retroreflective elements. During the application step, the glass spheres are at the temperature of the extruded rods. This process is difficult to scale up because a hot, partially molten strand of core material is generally quite weak and tends to break during processing.

SUMMARY OF THE INVENTION

The present invention provides a retroreflective element having optical elements selectively placed only on the vertical surface(s) which reduces raw material costs without substantially interfering with retroreflective performance. This retroreflective element is comprised of a core having a central layer having a first and a second major surface and at least one vertical surface, a barrier layer applied to the first major surface, a barrier layer applied to the second major surface, and a plurality of optical elements embedded in the vertical surface(s) of the central layer. Optionally, the retroreflective element further comprises skid-resistant particles. The retroreflective element may be irregular in shape or in the form of a disc, tile, polygon, or other regular shape.

Other embodiments of the present invention include methods of preparing and shaping the retroreflective element having optical elements and/or skid-resistant particles on selected surfaces. These methods provide a means to obtain retroreflective elements having a desired shape and size as well as uniform thickness.

Figure 1:
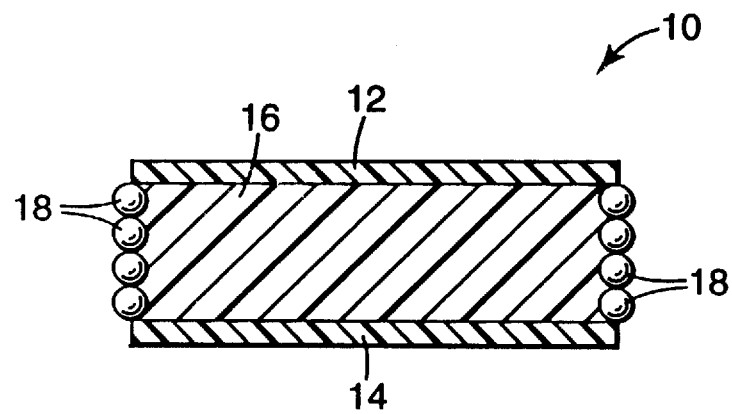
FIG. 1 is a cross-sectional view of the retroreflective element 10 where optical elements 18 are embedded in the central layer 16 and barrier layers 12 and 14 are on the central layer's first and second major surfaces respectively.

The FIGS., which are idealized and not to scale, are intended to be merely illustrative and non-limiting.

DETAILED DESCRIPTION OF ILLUSTRATIVE EMBODIMENTS

The present invention provides shaped retroreflective elements having optical elements and/or skid-resistant particles protruding from selected surfaces, particularly useful for retroreflecting light when applied to road surfaces, e.g., in conjunction with liquid pavement marking systems, and methods of forming them. The retroreflective elements include a plurality of optical elements, such as glass or ceramic microspheres, partially embedded in the vertical surfaces of the core's central layer. The core has a central layer having a first and a second major surface and at least one vertical surface. On the first and the second major surfaces, a barrier layer is applied. The central and barrier layers' compositions are selected such that a plurality of optical elements, when heated to the embedment temperature, embed and adhere to the central layer while the barrier layers are substantially free from optical elements.

One method of forming these retroreflective elements is by extruding a central layer between the barrier layers and calendering to the desired thickness. This composite is then processed into cores of desired shape and size. The cores are then combined with the optical elements such that the optical elements embed and adhere in the vertical surface(s) of the central layer at the embedment temperature.

Optical Elements

A wide variety of optical elements may be employed in the present invention. Typically, for optimal retroreflective effect, the optical elements have a refractive index of about 1.5 to about 2.6. The optical elements preferably have a diameter compatible with the size. Generally, optical elements of about 50 to about 1000 micrometers in diameter may be suitably employed. Preferably, the ratio of the diameter of the optical elements to the core vertical surface height is no greater than about 1.2. Preferably, the optical elements used have a relatively narrow size distribution for effective coating and optical efficiency.

The optical elements preferably consist of inorganic materials that are not readily susceptible to abrasion. Suitable optical elements include microspheres formed of glass, or a ceramic material having amorphous phases, preferably having indices of refraction of from about 1.5 to about 1.9. The optical elements most widely used are made of soda-lime-silicate glasses. Although the durability is acceptable, the refractive index is only about 1.5, which greatly limits their retroreflective brightness. Higher-index glass optical elements of improved durability, that can be used in this invention are taught in U.S. Pat. No. 4,367,919.

Further improvements in durability and refractive index have been obtained using microcrystalline ceramic optical elements as disclosed in U.S. Pat. Nos. 3,709,706; 4,166,147; 4,564,556; 4,758,469 and 4,772,511. Preferred ceramic optical elements are disclosed in U.S. Pat. Nos. 4,564,556 and 4,758,469, which are incorporated herein by reference in their entirety. These optical elements comprise at least one crystalline phase containing at least one metal oxide. These ceramic optical elements also may have an amorphous phase such as silica. The optical elements are resistant to scratching and chipping, are relatively hard (above 700 Knoop hardness), and are made to have a relatively high index of refraction.

The ceramic optical elements may comprise zirconia, alumina, silica, titania and mixtures thereof.

To enhance adhesion of the optical elements to the core, additives may be added during the formation of the core central layer or the optical elements may be directly treated with coupling agents. Suitable coupling agents and additives to enhance adhesion include silanes, titanates, zirconates, and the like. For examples of adhesion enhancers and coupling agents, see "Handbook of Adhesives," third edition, Irving Skeist, ed., Van Nostrand Reinhold, 1990, pages 536 to 555.

Core Materials

The core is comprised of at least three layers. With reference to FIG. 1, the central layer 16, in which the optical elements 18 embed, has a first 12 and a second 14 major surface. Although the retroreflective element typically is symmetrical about the central layer, it need not be. Depending on the desired shape, the central layer may have multiple vertical surfaces. Vertical surfaces are defined herein to mean generally upright. The central layer tackifies at a temperature less than the formation temperature of the optical elements. Desirable properties for the central layer include retention of shape during processing, resistance to weathering and road traffic, ability to adhere to the binder, the barrier layers, and to the optical elements.

Suitable central layer material includes polymeric materials, both thermoplastic and thermoset materials and mixtures thereof. Particular examples of suitable material can be readily selected by those skilled in the art. Potential central layer materials can be selected from a wide range of thermoplastic materials. For example, ethylene-vinylacetate copolymers, polyesters, polyvinylacetate, polyurethanes, polyureas, acrylic resins, methacrylic resins, ethylene-acrylate/methacrylate copolymers, ethylene-acrylic acid/methacrylic acid copolymers, polyvinyl butyral, and the like are useful. The central layer material can be comprised of one or more resin materials. Preferably the central layer material is processable in the 100° to 200° C. range.

Illustrative examples of thermoset materials useful for the central layer include amino resins, thermosetting acrylic resins, thermosetting methacrylic resins, polyester resins, drying oils, alkyd resins, epoxy and phenolic resins, polyurethanes based on isocyanates, polyureas based on isocyanates, and the like. Such compositions are described in detail in Organic Coatings: Science and Technology, Volume I: Film Formation, Components, and Appearance, Zeno W. Wicks, Jr., Frank N. Jones and S. Peter Pappas, ed., John Wiley & Sons, Inc., New York, 1992.

Figure 2:
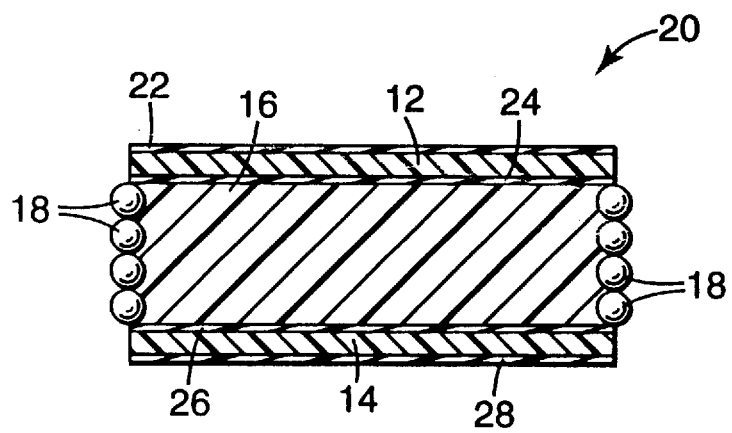
FIG. 2 is a cross-sectional view of the retroreflective element 20 where optical elements 18 are embedded in the central layer 16. The barrier layers 12 and 14 are coated with primer layers 22, 24, 26, 28, and are on the first and the second major surfaces of the central layer 16.

A barrier layer is applied to the first and the second major surfaces of the central layer. The barrier layer is comprised of at least one layer, but may have multiple layers. For example, with reference to FIG. 2, the barrier layer's 12 first and second major surfaces may be coated with additional materials such as a primer 22, 24 to enhance bonding resulting in a three-layer barrier layer (layers 22, 12, and 24). A primer can be coated onto the barrier layer to increase adhesion to the central layer material or a liquid binder used in a pavement marking. Typically the barrier layer thickness ranges from about 0.5 mil to about 10 mils (about 12 micrometers to about 250 micrometers). The barrier layers applied to the first and the second major surfaces of the central layer in a single retroreflective element of the invention may be comprised of the same or different materials.

One function of the barrier layers is to prevent the optical elements from embedding and adhering to the core first and second major surfaces. Thus, the barrier layers are substantially free of optical elements. During the embedment step, the optical elements are heated to and held at a temperature where they embed into and adhere to the central layer material subsequent to cooling to room temperature. This embedment temperature is at or above the tackifying temperature of the central layer material. The tackifying temperature is the temperature at which the optical elements freely adhere to a material. This temperature often is related to the softening temperature, melting temperature, or glass transition temperature of a material. In addition, the embedment temperature must be less than the temperature at which optical elements would embed in or adhere to the barrier layers. The embedment temperature may be limited by some physical properties of the material such as the barrier layer's softening, tackifying, melt, or glass transition temperature (Tg).

The barrier layer can prevent optical elements from embedding without having a clearly defined Tg, melting temperature, or softening temperature that is above that of the central layer material. For example, if the barrier layer is comprised of a highly crosslinked material, such as an epoxy resin, it may not exhibit a well defined Tg, softening, or melt temperature that is detectable by normal techniques such as DSC (differential scanning calorimetry). However, a highly crosslinked system will not flow nor become soft; and therefore, inhibits optical element embedment and functions as a suitable barrier layer for this invention.

The acceptability or usefulness of a barrier layer with a particular central layer material can be determined by a simple test. A section of the potential barrier layer is immersed in a bed of optical elements for the time and at the temperature where optical elements embed in the selected central layer material to at least 40% (i.e., the embedment temperature). At 40% embedment, the optical elements have good adhesion to the central layer. If the optical elements do not adhere to the barrier layer under the conditions where they freely adhere to the central layer material, then the barrier layer is suitable for use with that particular central layer material.

Preferably, the optical elements should not be heated to a temperature within about 10° C. of the temperature at which they can embed and adhere in the barrier layers.

The first and second major surfaces, which are generally horizontal when placed in the binder, do not retroreflect light as effectively as the vertical surfaces. In addition, they can affect the adhesion with the binder or collect dirt or other debris discoloring the retroreflective elements.

Other desired characteristics for the barrier layer include the ability to adhere to the binder and to the central layer, resistance to weathering and road traffic, and retention of shape during processing.

Various methods may be used to apply a barrier layer to the first and the second major surfaces of the central layer of the core. Suitable methods include, but are not limited to, lamination of a preformed sheet; application of a dense coating of at least one class of solid particles; extrusion or hot melt coating of at least one thermoplastic material and optionally at least one thermosetting material; coating and subsequently curing of at least one thermoset material and optionally at least one thermoplastic material; and solvent coating and subsequently drying of at least one thermoplastic material and optionally at least one thermosetting material onto the first and/or second major surfaces of the central layer. Each barrier layer can be comprised of one or more materials.

Suitable preformed sheets include, but are not limited to ethylene-vinylacetate copolymers, polyesters, polyvinylacetate, polyurethanes, acrylic resins, methacrylic resins, ethylene-acrylate/methacrylate copolymers, ethylene-acrylic acid/methacrylic acid copolymers, polyvinylidene chloride, polyvinyl butyral, polyimide, polyamides, and the like.

The barrier layers can comprise a woven or a nonwoven material. Suitable materials can be prepared from cotton, polypropylene, polyester, polyamide, polyurethane, bicomponent fibers and the like. For example, see Ullmann's Encyclopedia of Industrial Chemistry, 5th ed., 1991, vol. A 17, Nonwovens chapter, pp 565–587.

Illustrative examples of suitable solid particles that can be coated on the first and/or the second major surfaces of the central layer include, but are not limited to, classes of particles such as ceramics, glasses, polymeric resins, inorganic and organic pigments, and minerals such as carbonates, silicates, sulfates, oxides of aluminum, and oxides of alkali and alkaline earth metals. Examples of suitable minerals include calcium carbonate, calcium sulfate, clays, talc, gypsum, and mica. Pigments may be used which match the color of the binder if desired. One or more classes of particles may be used to form a single barrier layer in one retroreflective element.

Thermoplastic material can be extruded onto the first and/or the second major surfaces of the central layer. Suitable thermoplastic material include those materials identified above as suitable for a preformed sheet.

Another suitable barrier layer is a thermoset coating which is subsequently cured onto the first and/or the second major surfaces of the central layer. Suitable thermoset barrier layer material includes those materials identified above as suitable thermoset central layer material.

Optional Additives

Other materials may be included within the retroreflective elements of the present invention. These may be materials added to the core material during preparation, added to the core material by the supplier, and/or added to the retroreflective elements during coating with the optical elements. Examples of such materials include pigments, fillers, UV stabilizers, heat stabilizers, antioxidants, fungicides, processing aids, and skid-resistant particles. Generally see *Plastics Additives and Modifiers Handbook,* edited by Jesse Edenbaum, Van Nostrand Reinhold, New York, 1992.

A suitable pigment may be compounded into the core material, if desired, to impart opacity for retroreflection as well as to provide color. When added, the pigment generally comprises between about 1 and about 30 weight percent. Although typically, about 20 to about 30 weight percent (wt. %) pigment is used. The core can include specularly reflecting pigments, diffusely reflecting pigments, or both. Diffuse pigments are generally fine particles that are relatively uniform in size. The light hitting the diffuse pigment particles is reflected back at a number of angles, including back along the path of incident light. An example of a diffuse pigment is titanium dioxide. The core can be pigmented to match the color of the binder used. For edge striping on a highway, for example, a white rutile titanium dioxide or anatase titanium dioxide is typically used.

Specular pigments are generally thin and plate-like. The light hitting the specular pigment particles is reflected back at an angle equal but opposite to, that is, at a mirror image from the normal, of the angle at which it entered. Examples of plate-like pigments include, for example, leafing aluminum, mica, nacreous, and pearlescent pigments. Such pigments can be used to help maintain the shape of the core element during the application of the optical elements.

Other pigments that may be used to produce white, yellow, or other colored mixtures include aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc., as well as organic yellows such as those described in U.S. Pat. No. 5,286,682.

The pigments can be extended with suitable natural or manufactured granular materials. These fillers include, but are not limited to, zinc oxides and sulfides, amorphous or crystalline silica, calcium carbonate, calcium sulfate, perlite, clay, talc, marble, sand, and glass.

A stabilizing agent may be added to the core to improve resistance to UV light and/or heat of the core materials. For example, stabilizing agents such as nickel chelates, hindered phenols, and aryl esters may be included. Stabilizing agents also may include hindered amine light stabilizers (HALS) which may be present at levels up to about 5%. Exemplary HALS stabilizing agents are CHIMASSORB 944 available from Ciba-Geigy Corp., Additives Division, Hawthorne, N.Y., and CRYASORB UV 3346 available from American Cyanamid Co., Wayne, N.J. Other suitable stabilizing agents include, for example, antioxidants such as IRGANOX 1010 and IRGAFOS 168, both of which are available from Ciba-Geigy.

Processing aids can also be used in the retroreflective elements of the present invention. Typically, these are added to the core materials to enhance processing. That is, when combined with the core materials and other optional additives, a processing aid enhances dispersion or mixing. Processing aids such as dispersants, surfactants, and lubricants may be added. Examples of such processing aids may be found in *Plastics Additives and Modifiers Handbook,* edited by Jesse Edenbaum, Van Nostrand Reinhold, New York, 1992.

Typically skid-resistant particles do not play a role in retroreflectivity, rather they are often disposed on retroreflective and non-retroreflective pavement markings to reduce slipping by pedestrians, bicycles, and motor vehicles. The skid-resistant particles can be, for example, ceramics such as quartz, silicon carbide, aluminum oxide or other abrasive media. Preferred skid-resistant particles include fired ceramic spheroids having a high alumina content as taught in U.S. Pat. Nos. 4,937,127; 5,053,253; 5,094,902; and 5,124,178, the disclosures of which are incorporated herein by reference. Skid-resistant particles typically have sizes of about 200 to about 800 micrometers.

Processes

A retroreflective element having optical elements and/or skid-resistant particles only on selective surfaces may be formed by a variety of methods. One such method can be carried out by the steps of (a) making a core by (1) forming a central layer having a first and a second major surface and at least one vertical surface, into a sheet of desired thickness; (2) forming a barrier layer to the central layer's first major surface; and (3) forming a barrier layer to the central layer's second major surface; (b) processing the core into a desired shape and size; and (c) heating the core in a bed of optical elements to an embedment temperature such that the optical elements embed in the vertical surface(s) of the central layer. The present invention may be easily used for mass production.

The first process step is forming the central layer. Various methods may be used to form the core central layer. Suitable methods include, but are not limited to, extrusion or hot melt coating of at least one thermoplastic material and optionally at least one thermosetting material; coating and subsequently curing of at least one thermoset material and optionally at least one thermoplastic material; and solvent coating and subsequently drying of at least one thermoplastic material and optionally at least one thermosetting material.

For example, the materials can be mixed in a suitable solvent and cast onto a surface. This surface can be a release layer or a material that becomes part of the barrier layer.

Suitable solvents include methylethyl ketone, dichloroethane, toluene, tetrahydrofuran, isopropanol and the like. The solvent can be driven off by allowing the coating to dry at room temperature or at an elevated temperature, for example, using an oven.

Preferably, a 100% solids process is used to form the central layer. Often, solvents are a source of undesired effluent into the environment. Therefore, a solvent based process may increase the cost of the composition because of the energy required to remove, recapture, and dispose of the solvent.

A more preferred process for the formation of the core's central layer is based on the direct processing of solids. For example, a roll mill can be used to compound the central layer materials with any optional additives and then the composition can be calendered to the desired thickness. Alternatively, the materials can be batch mixed in the melt before forming a sheet of the desired thickness.

Most preferably the central layer material is extruded. Extrusion has several advantages over the previously described methods, such as the ease of handling solids and liquids, the continuous nature, and the wide variety of materials available to combine to obtain the optimum central layer properties. The central layer may be formed by extruding a sheet of desired thickness. The material is compounded with additives and pigments which provide the necessary properties for retroreflectivity.

The next process step is applying barrier layers to the first and the second major surfaces of the central layer. The function of the barrier layers is to prevent the optical elements from adhering to the first and second major surfaces of the core during the optical element embedment step. As discussed above, suitable methods for the formation of the barrier layers include, but are not limited to, lamination of a preformed sheet; application of a dense coating of at least one class of solid particles; extrusion or hot melt coating of at least one thermoplastic material and optionally at least one thermosetting material; coating and subsequently curing of at least one thermoset material and optionally at least one thermoplastic material; and solvent coating and subsequently drying of at least one thermoplastic material and optionally at least one thermosetting material onto the first and/or second major surfaces of the central layer. Each barrier layer can be comprised of one or more materials.

The polymeric barrier layers can be formed by any number of coating/forming processes for polymeric materials, as discussed above for the central layer formation. The solid particles for the dense coating are available commercially.

Following application of the barrier layers, the core can be converted into the desired shapes by any number of processes which can include die cutting, rotary die cutting, punch cutting, laser cutting, stamping, or slitting and chopping. The retroreflective elements are preferably essentially flat on their first and second major surfaces and have any suitable cross-section.

To mark a road, often retroreflective elements of the invention are dropped or cascaded on a binder already applied to the road surface. The retroreflective elements may be applied in an ordered or a random pattern. It is preferable for optimum retroreflectivity and adhesion to the binder that the final orientation of the retroreflective elements be such that essentially all of the first or second major surface is in contact with the binder. The size and shape, specifically the width and thickness, of the retroreflective element influences which surface ultimately adheres to the binder. The retroreflective elements can be formed into any desired shape using the method of the present invention. For retroreflective elements that are essentially simple geometric shapes, such as circles, ovals, triangles, squares, pentagons, hexagons, octagons, diamonds, parallelograms, rectangles, and the like, preferably the smallest diameter of the oval, the diameter of the circle, or the shortest edge length of a major surface is at least twice the thickness, so that the retroreflective elements tend to lay on their first or second major surface. The ratio of the diameter or edge length to the thickness is designated as the aspect ratio.

Cores in the shapes of squares, diamonds, parallelograms, rectangles, triangles, or hexagons, make the most efficient use of material by eliminating waste between the individual cores. Other possible shapes include, but are not limited to, circles, ovals, and octagons. The extra material from these shapes can be incorporated back into the central layer material at a level that does not interfere with the processing or with the performance of the central layer.

The retroreflective elements can be any size, but preferably they fit within the width of the binder. The retroreflective element can be of any thickness, but preferably the thickness is such that when the retroreflective element is embedded in the binder a sufficient number of optical elements are still exposed to give the desired retroreflectivity. However, as the portion of the retroreflective element exposed above the binder increases, the retroreflective element may be subjected to undesirable shear stress leading to retroreflective element loss.

As a non-limiting example, if a liquid binder has a thickness of 10 mils (0.254 mm), the retroreflective element could have an thickness of approximately 20 to 60 mils (0.5 to 1.5 mm). This thickness would account for embedment into the liquid binder and allow for wicking of the binder up the vertical surface of the retroreflective element. For a square retroreflective element of this thickness, the edge length of the major surface should be at least 40 mils (1.0 mm).

The presently preferred dimensions are approximately 40 to 100 mil (1.016 to 2.54 millimeter ("mm")) thickness; 3/16 inch to 3/8 inch (0.48 to 0.95 centimeter ("cm")) width; and 3/16 inch to 4 inches (0.48 to 10 cm) length.

Different shapes and sizes may provide advantages depending on the use. For example, a flat disc-shaped retroreflective element used in combination with ceramic optical elements is rather wear-resistant and envisioned to be useful in liquid marking systems. Retroreflective elements with a length equivalent to the width of a pavement marking, can more readily be applied in an ordered manner to the binder, which may enhance retroreflection and may result in more effective use of the optical elements.

The cores are then placed into a bed of pre-heated optical elements. Typically, the cores are at room temperature (i.e., 20° to 30° C.) and the optical elements are pre-heated to the embedment temperature. The embedment temperature preferably is higher than the tackifying temperature of the central layer, but below the temperature at which optical elements can freely adhere to the barrier layers. Preferably the embedment temperature is at least 10° C. less than the temperature where the optical elements freely adhere to the barrier layers. The dwell time and optical element embedment temperature preferably are optimized to prevent deformation, melting, agglomeration, etc., of the cores. The retroreflective elements may be separated from the excess optical elements by using a simple screen, centrifuge, floatation, or other separation process.

The process of attaching and embedding the optical elements in the central layer can be accomplished through a batch or continuous process. Such processes can be accomplished using a rotary kiln, a fluidizing chamber, a mixer, a tumbler, etc. Preferably, optical elements are embedded by adding the cores to a mobile bed of optical elements. The mobile bed of optical elements can be formed in a variety of ways, for example, in a fluidizing chamber or in a rotary kiln. Preferably, the process is carried out in a continuous manner using a rotary kiln.

Generally, this embedment method allows immediate attachment of the optical elements to a majority of the vertical surface area of the central layer (preferably the vertical surface area of the central layer is essentially close packed with the optical elements). Typically, the vertical surfaces do not tend to contain major portions that are void of optical elements. Further heating allows the optical elements to sink to the appropriate depth in the central layer. To achieve good adhesion and optical efficiency, typically, the optical elements embed to a depth of about 40% to about 80% of their average diameter. Preferably they are embedded to a depth of about 50% to about 70% of their average diameter.

The conditions of rotation, kiln rise, air flow, etc., can be varied by one skilled in the art to produce the appropriate dwell times for the materials used.

Typically, the optical elements embedded in the vertical surfaces are of similar composition and size. To reduce the amount of optical elements embedded on a selected surface, the optical elements may be blended with a second type of optical element, skid-resistant particles, or other filler, such as polymeric particles.

Applications

The retroreflective elements of the present invention can be dropped or cascaded onto binders such as wet paint, thermoset materials, or hot thermoplastic materials (e.g., U.S. Pat. Nos. 3,849,351, 3,891,451, 3,935,158, 2,043,414, 2,440,584, 4,203,878). In these applications, the binder (i.e., the paint, thermoset material, or thermoplastic material forms a matrix that serves to hold the retroreflective elements in a partially embedded and partially protruding orientation. The matrix can be formed from durable two component systems such as epoxies, polyurethanes, or polyureas, or from thermoplastic polyurethanes, alkyds, acrylics, polyesters, and the like. Alternate coating compositions that serve as a matrix and include the retroreflective elements described herein are also contemplated to be within the scope of the present invention.

Typically, the retroreflective elements of the present invention are applied to a roadway or other surface through the use of conventional delineation equipment. The retroreflective elements are dropped in a random position or a prescribed pattern onto the surface, and each retroreflective element comes to rest with one of its faces disposed in a downward direction such that it is embedded and adhered to the paint, thermoplastic material, etc. If different sizes of retroreflective elements are used, they are typically evenly distributed on the surface. When the paint or other film-forming material is fully cured, the retroreflective elements are firmly held in position to provide an extremely effective reflective marker.

The retroreflective elements of the present invention can also be used on preformed tapes used as pavement markings.

EXAMPLES

The following examples illustrate various specific features, advantages, and other details of the invention. The particular materials and amounts recited in these examples, as well as other conditions and details, should not be construed in a manner that would unduly limit the scope of this invention. Percentages given are by weight except as noted.

When polyester sheeting is used for the barrier layer, the sheet's first and second major surfaces preferably are treated with a primer to enhance the adhesion to the polymeric central layer. For example, unprimed polyester exhibited little adhesion to the central layer when the central layer was comprised of polyester polyols available from Huls America, Inc., Somerset, N.J. However, Corona treatment of the polyester barrier layer tended to improve the adhesion.

Example 1

The core central layer was prepared by compounding Dynapol™ S 1228, available from Huls America, Inc., Somerset, N.J., with 20 weight % titanium dioxide powder (R-960, available from DuPont, Wilmington, Del.). The titanium dioxide powder was dried in a vacuum oven at 110° C. overnight prior to use. The central layer material was compounded using a Haake model #81133 conical twin screw extruder (Haake, Inc., Saddle Brook, N.J.) with a Brabender controller, fitted with a set of standard screws. The extruder was divided into three regions, each having its own temperature control. Attached to the end of the extruder was a simple slot die (25.4 mm by 2.45 mm) with its own temperature control, zone #4. The temperature profile of the extruder was the following:

zone #1 194° F. (90° C.)
zone #2 235° F. (113° C.)
zone #3 272° F. (133° C.)
zone #4 266° F. (130° C.)

The central layer material was extruded into a three inch (7.6 cm) band between two poly(ethylene terephthalate) (PET) sheets primed on each major surface with PVdC (polyvinylidene chloride), available from Minnesota Mining and Manufacturing Company, St. Paul, Minn. (3M), using nip rolls heated to about 95° C. The primed PET sheets were each approximately 6 inches (15.2 cm) wide and 4 mils (101.6 micrometer) thick. The composite construction was about 40 to about 50 mils (1 mm to 1.3 mm) thick.

The composite construction was then shaped into cores. A conventional paper cutter was used to form squares having a side length of approximately 0.25 inch (0.64 cm). A standard office paper punch was used to form 0.25 inch (0.64 cm) diameter circles.

If the cores were not immediately shaped after formation of the composite, the composite was heated at about 100° C. for about 20 minutes prior to being shaped to ensure good adhesion between the barrier layers and the central layers.

The circle and square shaped cores were then placed into a jar containing pre-heated (about 140° C.) ceramic optical elements having a refractive index of about 1.9 for optical element embedment. The optical elements, about 100 to about 200 micrometers in diameter, were comprised of zirconium-aluminum-silicate. Various methods of manufacturing these optical elements are available, such as described in U.S. Pat. No. 4,772,511 (Wood et al.).

The jar was shaken periodically, about every 2 to 3 minutes, to aid the embedment of optical elements. After about 10 minutes, the retroreflective elements were separated from the excess optical elements by filtration. At 140° C., the optical elements were embedded into the vertical surfaces of the central layer material to about 50% of their average diameter.

Example 2

Retroreflective elements were prepared following the procedure described in Example 1. Dynapol S1402, available from Huls America, was substituted for Dynapol S1228 as the central layer material.

In addition, the optical elements embedded into the central layer were comprised of zirconium-silicate having a refractive index of 1.75. Various methods of manufacturing these optical elements are available such as described in Example 4 of U.S. Pat. No. 4,564,556. Prior to embedment, the optical elements were treated with an aminosilane coupling agent, A-1100, available from Union Carbide, Danbury, Conn., at a level of 600 ppm A-1100 per dry optical element.

Before application to the optical elements, the A-1100 was hydrolyzed for about 15 minutes with water, about 0.045 Kg water per 0.45 Kg optical element. This amount of water allowed good wetting of the optical elements without tending to unevenly coat the optical elements. This solution was then mixed with the optical elements, and the treated optical elements were placed in an oven (about 100° F. (38° C.)) overnight. After drying, the optical elements were agitated to produce a free flowing material.

The extruder described in Example 1 was used to form the central layer. However, a static mixing section (zone #4) was added in front of the slot die (zone #5). The temperature profile of the extruder was as follows:
zone #1 174° F. (79° C.)
zone #2 228° F. (109° C.)
zone #3 220° F. (104° C.)
zone #4 230° F. (110° C.)
zone #5 212° F. (100° C.)
The nip rolls were held at 85° C. Optical element embedment and adhesion were optimum at about 120° C. for about 10 minutes.

Example 3

Retroreflective elements were prepared following the procedure described in Example 2. Dynapol S1227, available from Huls America, was substituted for Dynapol S1402 as the central layer material. The temperature profile of the extruder was the following:
zone #1 196° F. (91° C.)
zone #2 283° F. (139° C.);
zone #3 289° F. (143° C.)
zone #4 305° F. (152° C.)
zone #5 266° F. (130° C.).
The nip rolls were held at about 85° C. Conditions used for optical element embedment were about 150° C. for about 10 minutes.

Example 4

Retroreflective elements were prepared following the procedure described in Example 2. Dynapol S1228, available from Huls America, was substituted for Dynapol S1402 as the central layer material. The temperature profile of the extruder was the following:
zone #1 174° F. (79° C.)
zone #2 255° F. (124° C.)
zone #3 240° F. (116° C.)
zone #4 265° F. (129° C.)
zone #5 248° F. (120° C.)
The nip rolls were held at 85° C. Conditions used for optical element embedment were about 120° C. for about 10 minutes.

Example 5

Retroreflective elements were prepared following the procedure described in Example 2. Dynapol S1252, available from Huls America, was substituted for Dynapol 1402 as the central layer material. The temperature profile of the extruder was the following:
zone #1 188° F. (87° C.)
zone #2 264° F. (129° C.)
zone #3 285° F. (141° C.)
zone #4 319° F. (159° C.)
zone #5 338° F. (170° C.).
The nip rolls were held at about 85° C. Conditions used for the optical element embedment were about 150° C. for about 20 minutes.

Example 6

Retroreflective elements were prepared following the procedure described in Example 2, compounding various levels of PKFE, a polymer of bisphenol A from Phenoxy Associates, (Rock Hill, S.C.), with the Dynapol S 1227 as the central layer material. The $TiO_2$ concentration was held at about 20% to about 21%, while the PKFE concentration was varied at 6%, 11%, and 21%. The temperature profile of the extruder was the following:
zone #1 250° F. (121° C.)
zone #2 336° F. (169° C.)
zone #3 349° F. (176° C.)
zone #4 331° F. (166° C.)
zone #5 284° F. (140° C.).
The thickness of the composite ranged from about 0.8 mm to about 1.4 mm. Cores were prepared from the 21% PKFE mixture by cutting the composite construction into squares using a conventional paper cutter, about 6 mm to about 7 mm on a side. Retroreflective elements were prepared by placing the cores in a bed of treated ceramic optical elements (as described in Example 2) held at 150° C. for about 10 minutes. The retroreflective elements were separated from the excess optical elements by filtration.

Example 7

Cores in the shapes of circles and squares were prepared according to Example 1. Samples were prepared for reflectometry measurements in the following manner. A binder for the retroreflective elements was formed by coating a two-part polyurea composition on a piece of tar paper (61 cm×10 cm) to the desired thickness. The polyurea composition was a mixture of 75 parts per hundred XP7053, from Bayer, Pittsburgh, Pa., pigmented with R-960 titanium dioxide at 50%, and 25 parts per hundred N3300 (Bayer).

For the retroreflective elements shaped as circles (approximately 1 mm thick), the ordered sample consisted of 17 rows spaced out evenly along the length of the binder. The circles were positioned with their edges touching the adjacent retroreflective element. This arrangement required a total of 11.37 g of retroreflective elements. For the random arrangement, 11.37 g of the circle retroreflective elements were then weighed out and scattered over the area of the sample in a random pattern. For the retroreflective elements shaped as squares (approximately 1.3 mm thick), the ordered sample consisted of 12 rows spaced out evenly along the length of the binder. The squares were positioned with their edges touching the adjacent retroreflective element. This arrangement required a total of 16.3 g of retroreflective elements. For the random arrangement, 16.3 g of the square retroreflective elements were then weighed out and scattered over the area of the sample in a random pattern.

Reflectometry measurements were made by using the procedures described in ASTM test method D4061-81, "Standard Test Method for Retroreflectance of Horizontal Coatings." For Test Method 1, the entrance angle is 86.5° and the observation angle is 1.0°. For Test method 2, the entrance angle is 88.5° and the observation angle is 1.0°. For Test Method 3, the entrance angle is 88.8° and the observation angle is 1.05°.

Reflectivity Measurements

| Shape | Reflective Element Arrangement | Coating Thickness | Test Method #1 | Test Method #2 | Test Method #3 |
|---|---|---|---|---|---|
| | | | Reflectivity mcd/m$^2$/lux (millicandela/meter$^2$/lux) | | |
| circle | random | 10 mil (254 micrometers) | 300 | 373 | 368 |
| circle | ordered | 10 mil (254 micrometers) | 789 | 934 | 908 |
| square | random | 15 mil (381 micrometers) | 332 | 404 | 398 |
| square | ordered | 15 mil (381 micrometers) | 677 | 790 | 753 |

Example 8

Retroreflective elements were prepared following the procedure described in Example 4. Dynapol S 1227 was substituted for Dynapol S 1252 as the central layer material. Cores shaped as squares, circles and hexagons were prepared using a Stripit Super 30 punch press (available from Stripit Inc., a unit of Idex Corp., Akron, N.Y.). The square shape was 6.35 mm/side, the circle shape was 6.35 mm in diameter, and the hexagon shape was 6.35 mm point to point. Retroreflective elements were prepared by placing the cores in a jar of treated ceramic optical elements (as described in Example 2) pre-heated to about 140° C. for about 10 minutes. The jar was shaken periodically, about every 2 to 3 minutes, to aid the embedment of optical elements. The retroreflective elements were separated from the excess optical elements by filtration.

Samples were prepared for reflectometry measurements. Aluminum panels (10 cm×61 cm×0.635 mm) were coated with flat black spray paint. An ordered and a random arrangement of retroreflective elements were used.

For the random arrangement, a random pattern of holes (0.635 cm diameter) was punched into paper stock to act a template. This template was laid over the aluminum panel and Super 77 spray adhesive (3M) was applied, forming a discrete pattern of adhesive. The retroreflective elements were applied to the adhesive. A total of 94 retroreflective elements were applied to the panels.

For the ordered arrangement, the retroreflective elements were placed in rows 10 cm apart, totaling 7 rows per panel. For squares, there were 13 retroreflective elements per row, while for circles and hexagons, there were 14 retroreflective elements per row. The retroreflective elements were affixed to the panel using either double-sided stick tape (3M) or Super 77 spray adhesive (3M). The retroreflective elements were laid down such that each one touched the adjacent retroreflective element, for example, the squares' flat sides touched and the hexagons' points touched.

Reflectivity measurements were made according to the procedure described in Example 7 for Test Method #2. Measurements started with the full panel. Successive measurements were made after removing a specific number of retroreflective elements. For the random arrangement, the order of removal was random. For the ordered arrangement, the same number of retroreflective elements were removed in a non-ordered fashion from each row. The results of these measurements are presented in the accompanying table.

Ordered Arrangement

| Number of Reflective Elements | Reflectivity Measurement mcd/m$^2$/lux | | |
|---|---|---|---|
| | Squares | Circles | Hexagons |
| 98 | — | 994 | 883 |
| 91 | 1157 | — | — |
| 84 | 1051 | 847 | 773 |
| 77 | 948 | — | — |
| 70 | 880 | 727 | 677 |
| 63 | 789 | — | — |
| 56 | 705 | 596 | 561 |
| 49 | 613 | — | — |
| 42 | 552 | 450 | 424 |
| 35 | 468 | — | — |
| 28 | 383 | 314 | 322 |
| 21 | 273 | — | — |
| 14 | 167 | 160 | 174 |
| 7 | 76 | — | — |

Random Arrangement

| Number Present | Reflectivity Measurement mcd/m$^2$/lux | | |
|---|---|---|---|
| | Squares | Circles | Hexagons |
| 98 | 839 | 755 | 679 |
| 84 | 760 | 678 | 609 |
| 70 | 682 | 632 | 575 |
| 56 | 638 | 502 | 499 |
| 42 | 551 | 402 | 415 |
| 28 | 407 | 284 | 287 |
| 14 | 226 | 165 | 148 |

Example 9

A central layer was prepared using Dynapol S1227 with the same extruder conditions as in Example 4. However, for the barrier layer construction, 2.5 mil (63.5 micrometers) unprimed PET sheets available from 3M, were substituted for the PVdC primed PET. The unprimed PET acted as a release liner and was stripped off of the central layer. A section of the central layer, approximately 50 to 60 mils (1.3 mm to 1.5 mm) in thickness, was coated with a solution of 2 weight % triarylsulfonium hexafluoroantimonate (3M) in ERL-4221 (3,4-epoxycyclohexylmethyl-3,4-epoxycyclohexanecarboxylate, available from Union Carbide, Danbury, Conn.), using a #12 wire wound rod available from R.D. Specialties, Webster, N.Y. One side was coated first, then exposed to a bank of six 15 watt Philips BL bulbs (available from Philips Lighting Co., Somerset, N.J.) to produce a tack-free film. Then the opposite side was coated and exposed to ultraviolet light (UV). The exposure to UV light cured the epoxy coating into a highly crosslinked sheet which served as a barrier layer. Cores were shaped into squares approximately 6.35 mm on a side using a paper cutter. Retroreflective elements were prepared by placing the cores in a jar of treated ceramic optical elements preheated to about 140° C. for about 10 minutes. The jar was shaken periodically, about every 2 to 3 minutes, to aid the embedment of optical elements. The crosslinked epoxy prevented the optical elements from adhering to the first and second major surface of the core.

Example 10

Square retroreflective elements from Examples 2, 3, 4, 5, and 9 were placed on a vehicle wear simulator to simulate the wear conditions experienced by a pavement marking used as a lane marking. The simulator has a test area consisting of a vertical ring about 3.5 meters in diameter and about 30.5 centimeters in width made up of concrete blocks. The test was run with two standard automobile tires perpendicular to the test surface at opposite ends of a rigid connecting frame, each inflated to 35 psi (2.5 kg/cm$^2$) pressure and with 40 psi (2.8 kg/cm$^2$) pressure applied to each tire as a load. The tire was run at the equivalent of 25 mph (40 km/hr).

Samples for the simulator were prepared by 1) sand blasting the curved 10 inch×12 inch (25.4 cm×30.5 cm) concrete blocks, which form the vertical ring, to remove any prior coating, 2) applying a 25 mil (0.625 mm) coating of a two-part polyurea binder consisting of 60% XP7053 (Bayer) and 40% N3300 (Bayer), 3) dropping 18 retroreflective elements into the binder in a two inch (5 cm) wide strip in a random pattern, and 4) allowing the binder to cure at least overnight before proceeding with the test. All of the samples were inspected visually before beginning the test to determine optical element and retroreflective element adhesion. The samples were inspected periodically to determine optical element and retroreflective element retention. After 1 million revolutions, the samples showed little wear, essentially no optical element loss, and no loss of retroreflective elements from the binder.

Example 11

Retroreflective elements in circular shapes were prepared according to Example 1. To prepare retroreflective elements with optical elements on the central layer's first major surface and the vertical surface, corona treated polyester (3M) was used as the barrier layer. After the circles were cut from the composite construction using a 0.25 inch (0.64 cm) hole punch, the barrier layer was removed from the first major surface, leaving that surface free to accept optical elements. Ceramic optical elements (as described in Example 1) were applied to the cores by placing them in a jar of optical elements pre-heated to about 140° C. for 10 minutes. The jar was shaken periodically, about every 2 to 3 minutes, to aid the embedment of optical elements.

Samples were prepared for reflectometry measurements according to the test methods described in Example 7, using only an ordered arrangement of circles.

Reflectivity Measurements

| Shape | Optical Element Arrangement | Coating Thickness | Reflectivity (mcd/m$^2$/lux) Test Method #1 | Test Method #2 | Test Method #3 |
|---|---|---|---|---|---|
| circle | vertical surface only | 10 mil (254 micrometers) | 558 | 694 | 698 |
| circle | vertical surface and first major surface (exposed) | 10 mil (254 micrometers) | 730 | 855 | 808 |

Circles, 1 mm thick by 6.35 mm in diameter, with optical elements on the first major surface and the vertical surface have about 2.6 times the surface area covered with optical elements, but deliver only about 1.3 times the brightness of retroreflective elements with optical elements only on the vertical surface. If the retroreflective element had optical elements on the first and the second major surfaces and the vertical surface, about 4.2 times the surface area would be covered with optical elements as compared with the vertical surface area, but the brightness would remain only 1.3 times because one major surface would be covered by the binder. Thus, the optical elements are most efficiently used by placing them only on the vertical surface(s).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A retroreflective element comprising:
    a) a core having:
        i) a central layer having a first and a second major surface, and at least one vertical surface;
        ii) a barrier layer applied to the first major surface of the central layer, and
        iii) a barrier layer applied to the second major surface of the central layer, and
    b) a plurality of optical elements partially embedded in the vertical surfaces of the central layer.

2. The element according to claim 1 further comprising skid-resistant particles partially embedded in at least one barrier layer.

3. The element according to claim 1 wherein the optical elements are uncoated microspheres, hemispherically coated microspheres, coated microspheres, or mixtures thereof.

4. The element according to claim 1 wherein the optical elements comprise an amorphous phase, a crystalline phase, or mixtures thereof.

5. The element according to claim 1 wherein said central layer comprises a material selected from the group consisting of thermoplastic materials, thermoset materials, and mixtures thereof.

6. The element according to claim 5 wherein said thermoplastic material is selected from the group consisting of ethylene-vinylacetate copolymers, polyesters, polyvinylacetate, polyurethanes, polyureas, acrylic resins, methacrylic resins, ethylene-acrylate/methacrylate copolymers, ethylene-acrylic acid/methacrylic acid copolymers, polyvinyl butyral, and mixtures thereof.

7. The element according to claim 5 wherein said thermoset material is selected from the group consisting of amino resins, thermosetting acrylic resins, thermosetting methacrylic resins, polyester resins, drying oils, alkyd resins, epoxy and phenolic resins, polyurethanes based on isocyanates, polyureas based on isocyanates, and mixtures thereof.

8. The element according to claim 1 wherein the barrier layers applied to the first and second major surfaces comprise different materials.

9. The element according to claim 1 wherein the barrier layers applied to the first and second major surfaces comprise same materials.

10. The element according to claim 1 wherein at least one barrier layer is a preformed sheet.

11. The element according to claim 10 wherein said preformed sheet comprises a material selected from the group consisting of ethylene-vinylacetate copolymers, polyesters, polyvinylacetate, polyurethanes, acrylic resins, methacrylic resins, ethylene-acrylate/methacrylate copolymers, ethylene-acrylic acid/methacrylic acid copolymers, polyvinylidene chloride, polyvinyl butyral, polyimide, polyamides, and mixtures thereof.

12. The element according to claim 1 wherein at least one barrier layer comprises densely packed solid particles selected from the group consisting of ceramic, glass, polymeric resin, pigments, and minerals.

13. The element according to claim 1 wherein at least one barrier layer comprises a polymeric material.

14. The element according to claim 13 wherein said polymeric material comprises a material selected from the group consisting of ethylene-vinylacetate copolymers, polyester, polyvinylacetate, polyurethanes, acrylic resins, methacrylic resins, ethylene-acrylate/methacrylate copolymers, ethylene-acrylic acid/methacrylic acid copolymers, polyvinylidene chloride, polyvinyl butyral, polyimide, polyamides, and mixtures thereof.

15. The element according to claim 1 wherein at least one barrier layer comprises a thermoset material.

16. The element according to claim 15 wherein said thermoset material is selected from the group consisting of amino resins, thermosetting acrylic resins, thermosetting methacrylic resins, polyester resins, drying oils, alkyd resins, epoxy and phenolic resins, polyurethanes based on isocyanates, polyureas based on isocyanate, and mixtures thereof.

17. The element according to claim 1 wherein the element has an aspect ratio of at least 2.

18. The element according to claim 1 further comprising one or more of: pigment, filler, UV stabilizer, antioxidant, heat stabilizer, fungicides, and processing aids.

19. A pavement marking for use on a road comprising retroreflective elements according to claim 1 adhered to a roadway with a binder.

20. The pavement marking according to claim 19 wherein said binder comprises a material selected from the group consisting of epoxies, polyurethanes, polyurea, alkyds, acrylics, polyesters, and mixtures thereof.

21. The pavement marking according to claim 19 wherein said binder comprises a material, a thermoset material, a thermoplastic material, or mixtures thereof.

22. A method of making a retroreflective element comprising the steps of:
   (a) forming a core by:
      (i) forming a central layer having a first and a second major surface and at least one vertical surface into a sheet of desired thickness;
      (ii) forming a barrier layer to said first major surface; and
      (iii) forming a barrier layer to said second major surface;
   (b) processing said core into the desired shape and size; and
   (c) heating said core in a bed of optical elements to an embedment temperature such that a plurality of optical elements become partially embedded in the vertical surface(s) of the central layer.

23. The method according to claim 22 wherein said embedment temperature is at least 10° C. less than a temperature where optical elements freely adhere to said barrier layers.

24. The method according to claim 22 wherein said optical elements having an average diameter are embedded into the vertical surface(s) of the central layer to a depth of about 50% to about 70% of their average diameter.

25. The method according to claim 22 wherein the optical elements are essentially close packed on the vertical surface(s) of the central layer.

* * * * *